(12) United States Patent
Saksena

(10) Patent No.: US 6,299,920 B1
(45) Date of Patent: Oct. 9, 2001

(54) SYSTEMS AND METHOD FOR NON-INVASIVE ASSESSMENT OF COOKED STATUS OF FOOD DURING COOKING

(75) Inventor: Atul Saksena, Troy, OH (US)

(73) Assignee: Premark FEG L.L.C., Wilmington, DE (US)

(*) Notice: Subject to any disclaimer, the term of this patent is extended or adjusted under 35 U.S.C. 154(b) by 0 days.

(21) Appl. No.: 09/434,786

(22) Filed: Nov. 5, 1999

Related U.S. Application Data (60) Provisional application No. 60/107,249, filed on Nov. 5, 1998.

(51) Int. Cl.⁷ .......................................... A47J 37/00
(52) U.S. Cl. .................. 426/231; 426/233; 426/523; 99/329 R; 99/331; 99/344; 99/422; 219/706; 219/710; 219/711; 374/149
(58) Field of Search .................. 99/329 R, 331, 99/333, 344, 422; 426/231, 523, 233; 219/711, 706, 710; 73/169; 374/117, 121, 149

(56) References Cited

U.S. PATENT DOCUMENTS

| | | | |
|---|---|---|---|
| 4,049,938 | 9/1977 | Ueno | 219/10.55 R |
| 4,467,164 | * 8/1984 | Nakata et al. | 219/10.55 M |
| 4,568,201 | 2/1986 | Noda | 374/128 |
| 4,734,553 | 3/1988 | Noda | 219/10.55 B |
| 4,751,356 | 6/1988 | Fukuda et al. | 219/10.55 B |
| 4,831,239 | * 5/1989 | Ueda | 219/518 |
| 4,868,357 | * 9/1989 | Serikawa et al. | 219/10.55 B |
| 5,096,725 | 3/1992 | Kim | 426/233 |
| 5,132,914 | * 7/1992 | Cahlander et al. | 364/478 |
| 5,181,778 | 1/1993 | Beller | 374/119 |
| 5,293,019 | * 3/1994 | Lee | 219/708 |
| 5,303,708 | 4/1994 | Stouffer | 128/660.01 |
| 5,530,229 | 6/1996 | Gong et al. | 219/711 |
| 5,693,247 | 12/1997 | Bu et al. | 219/711 |
| 5,702,626 | 12/1997 | Kim | 219/711 |
| 5,744,786 | 4/1998 | Kim | 219/711 |
| 6,155,160 | * 12/2000 | Hochbrueckner | 99/331 |

FOREIGN PATENT DOCUMENTS

| | | |
|---|---|---|
| 3410465A1 | 10/1985 | (DE) . |
| 0622973A1 | 11/1994 | (EP) . |
| 0794387A1 | 9/1997 | (EP) . |

* cited by examiner

*Primary Examiner*—Keith Hendricks
*Assistant Examiner*—Drew Becker
(74) *Attorney, Agent, or Firm*—Thompson Hine LLP

(57) ABSTRACT

A non-contact system and method is provided for effectively approximating the internal temperature of food being cooked upon a cooking surface of a cooking apparatus, such as a grill or griddle. Ultrasound or infrared, non-contact measurement devices may be directly installed onto the cooking apparatus, and in concert with a computerized monitoring/control system, are used to monitor the status of the food being cooked, or to control the heat input to the cooking surface using a feedback loop. The non-contact measurement devices may be permanently positioned above the cooking surface or may be mounted to arms that can be pivoted, or otherwise moved into position over the cooking surface.

30 Claims, 4 Drawing Sheets

SYSTEMS AND METHOD FOR NON-INVASIVE ASSESSMENT OF COOKED STATUS OF FOOD DURING COOKING

CROSS-REFERENCE TO RELATED APPLICATIONS

This present application claims priority under 35 U.S.C. §119 from Provisional Application Serial No. 60/107,249 filed Nov. 5, 1998.

BACKGROUND

The present invention relates to cooking apparatuses and method for cooking food products, and more particularly to an apparatus and method for assessing the cooked status of the food product during cooking, using non-invasive sensing devices and systems.

The demand for fast food is increasing more than ever before, and the necessity of quality fast food is also increasing with the demand. A significant concern with the increasing demand for fast food, is the potential that the meats (hamburger patties, chicken breast portions, etc.) Being rapidly prepared are not all being cooked sufficiently or to the proper temperatures. This could lead to the insufficient destruction of microorganisms in the food, which could cause sickness or disease if eaten. Cooking the foods to the proper temperatures (as specified by FDA) will destroy such harmful microorganisms in the food.

Since most fast food meats remain frozen until it is time for the food to be cooked, it is difficult to ensure that the inner-most section of food is properly cooked. A common means of checking internal temperature is using a thermometer or a thermocouple. This is a contact type of process where the probe will have to physically enter the food to measure the temperature. Such processes are time consuming and difficult to perform in a fast-food preparation atmosphere.

Accordingly there is a need for automated, non-contact methods and apparatuses for effectively measuring or estimating the internal temperature of food being cooked. These methods will measure/estimate core temperature on-line, tremendously reducing the chances of undercooked food being served and, thereby, reducing the risk of disease/virus/bacteria carry over with food.

One possible contact-less method could be assessment of reduction of weight of food. This is based on decrease in weight of food as it is cooked. The reduction primarily comes from evaporation of moisture from food. Here we are expecting to have near constant moisture content in food, which seems little too much to expect. Also, differential evaporation may occur, i.e., food may lose too much water from the surface and adjacent area (which may indicate adequate cooking) while core may still be under cooked. Also the accuracy and repeatability required for such an instrument is not currently available. Then there are possible methods like LASER and Laser ultrasound, but these at present times may not financially viable.

SUMMARY

The present invention provides a non-contact system and method for effectively approximating the internal temperature of food being cooked upon a cooking surface of a cooking apparatus, such as a grill or griddle. Ultrasound or infrared, non-contact measurement devices may be directly installed onto the cooking apparatus, and in concert with a computerized monitoring/control system, are used to monitor the status of the food being cooked, or to control the heat input to the cooking surface using a feedback loop. The non-contact measurement devices may be permanently positioned above the cooking surface or may be mounted to arms that can be pivoted, or otherwise moved into position over the cooking surface.

One aspect of the present invention is a method for determining an internal temperature of a food product being cooked upon a cooking surface comprising the steps of: (a) positioning an ultrasonic transducer over a food product being cooked upon a cooking surface; (b) activating the ultrasonic transducer to generate ultrasonic waves targeted to the food product; (c) positioning an ultrasonic probe over the food product; (d) activating the ultrasonic probe to detect ultrasonic waves reflected from the food product; and (e) processing the reflected ultrasonic waves to obtain an approximate internal temperature of the food product. Preferably, the approximate internal temperature is obtained by utilizing signal processing algorithms/devices to extract an approximation of the change in natural frequency of the food product from the reflected ultrasonic waves. The ultrasonic transducer and probe can be incorporated into a single measurement device, or may be separate devices. The output of the signal processing algorithms/devices may be fed to a computerized control system responsible for controlling the temperature of the cooking surface; and/or may be fed to an alarm or signal device used to inform the cook when the food products are sufficiently cooked.

Another aspect of the present invention is a method for determining an internal temperature of a food product being cooked upon a cooking surface comprising the steps of: (a) positioning an infrared sensor over a food product being cooked upon a cooking surface; (b) obtaining a first surface temperature reading of the food product at a first point in time with the infrared sensor; (c) obtaining a second surface temperature reading of the food product at a second point in time with the infrared sensor; and (d) approximating an internal temperature of the food product using the first and second temperature readings. Preferably, surface temperature readings are obtained continuously and the internal temperature is approximated by signal processing algorithms/devices that determine the rate of rise of the surface temperatures of the food product surface temperature. In one embodiment, to approximate the internal temperature of the food product, the rate of rise is compared against a predefined curve.

Accordingly, it is an object of the present invention to provide a non-contact system and method for effectively approximating the internal temperature of food being cooked upon a cooking surface of a cooking apparatus, such as a grill or griddle. It is a further object of the present invention to provide a cooking apparatus and system that utilizes non-contact, ultrasound or infrared measurement devices, which may be installed directly onto the cooking apparatus. And it is also an object of the present invention to provide a computerized monitoring/control system, that works in concert with the ultrasound or infrared measurement devices to monitor the status of the food being cooked, and to provide an alarm to the user when the food product is determined to be cooked or to control the heat input to the cooking surface using a feedback loop. These and other objects and advantages of the present invention will be apparent from the following description, the attached drawings and the appended claims.

DETAILED DESCRIPTION
Temperature Measurement Using Ultrasonic Waves

Food can be considered as a medium consisting of discrete or disunited vibrating particles known as scatterers. These scatterers vibrate upon application of exciting media such as ultrasound waves. The fundamental frequency of scatterers changes with the change in temperature of food. This change, or shift in fundamental frequency can be directly correlated with the change in temperature. By observing the change in fundamental frequency of food while cooking, the first embodiment of the present invention assess the temperature of food.

The speed of sound of in a medium is a direct function of temperature of the medium.

$$C = f(T) \tag{1}$$

Where C is the speed of sound in a medium, and T is the temperature of the medium.

In water and most other tissues, speed of sound "C" increases with increase in temperature. In fatty tissues, "C" decreases with increase in temperature.

As far as Ultrasound is concerned, most biological tissues can be considered as consisting of semi-regular lattice of disunited scatterers. An average distance 'd' separates these scatterers from each other, which is called the average scatterer spacing. The average scatterer spacing 'd' in tissue increases with increase in temperature and decreases with reduction in temperature. This variation in scatterer spacing 'd' as a function of temperature can be determined by the coefficient of linear thermal expansion 'α' of the medium or tissue.

Fundamental frequency $f_1$ of medium or tissue is associated with scatterer spacing 'd' and is defined as $$f_1 = \frac{C}{2d} \tag{2}$$

Since both 'C' and 'd' are dependent upon the temperature of the medium, the fundamental frequency of medium will shift with change in temperature. This frequency shift will not only affect fundamental frequency '$f_1$' but also the higher harmonics of this frequency.

The data containing information about frequency shift and about temperature change can be extracted by high-resolution power spectral density ("PSD") technique. A high-resolution PSD is needed in order to identify and track the fundamental frequency $f_1$, its harmonics and the temperature change of target medium. High resolution PSD can be generated based on an auto regressive ("AR") model. The AR PSD can be computed from AR parameters, which can be computed assuming that the discrete ultrasound back scattered signal is modeled as an AR process. An AR process is defined by the autocorrelation sequence.

$$r_{xx}[k] = -\sum_{l=1}^{p} a[l] r_{xx}[k-1] + \sigma^2 \delta(k) \quad \text{for } k \geq 0 \tag{3}$$

Where a[1] for 1=1,2 . . . p are the AR model coefficient parameters (with a[0] =1), p is the model order, $\sigma^2$ is the excitation white noise variance of the AR model and δ(k)=1 for k=0, δ(k)=0 otherwise. A high resolution and high harmonic detail method for PSD computation is needed since the changes in $f_1$, and its harmonics due to changes in the temperature of the target medium are quite small, and usually below or on the order of the detail limit of standard Fourier analysis methods.

The direct determination of fundamental frequency '$f_1$' can be arduous because '$f_1$' lies out of the range of most ultrasonic transducers and also because $f_1$ is highly attenuated. However $f_1$ can be indirectly evaluated by measuring three or more harmonics of $f_1$ which are within the range of transducer. The fundamental frequency '$f_1$' is related to two adjacent harmonics $f_x$ and $f_{x+1}$ by $$f_1 = f_{x+1} - f_x \tag{4}$$

Using higher harmonics of fundamental frequency has added advantage. A small change in results in a small change in 'd', this small change Δd changes the frequency of fundamental $f_1$ $$(f_1 + \Delta f) = \frac{C}{2(d + \Delta d)} \tag{5}$$

This small change is enhanced in its harmonics as change in harmonics is related to change in fundamental $f_1$ by $$\Delta f_x = x \Delta f_1 \tag{6}$$

Changes in $f_x$ are therefore dependent on the average scatterer spacing of the target medium, the speed of sound in the medium, and hence are related to the temperature change of the medium. This can be expressed in terms of d, c and temperature T $$f_x(T) = \frac{xC(T)}{2d(T)}, \quad x = 1, 2, \cdots, \infty \tag{7}$$

The average scatterer spacing 'd' is a fiction of temperature and linear coefficient of thermal expansion 'α' of medium, it can be expressed as $$d = d_0(1 + \alpha \Delta T) \tag{8}$$

Where $d_0$ is the average scatterer spacing at reference temperature of $T_0$.

Based equation (7) and (8), the temperature dependence of change of frequency $f_x$ can be expressed as $$\Delta f_x(T) = \frac{k}{2d_0} \left[ \frac{\partial c(T)}{\partial T} \bigg|_{T=T_0} - \alpha c_0 \right] \Delta T \tag{9}$$

Where, $c_0$ is the speed of sound in the medium at reference temperature $T_0$.

In equation (9), for the case of water or cow muscle (beef), the effect of second term ($\alpha c_0$) is an order of magnitude less than the first term. Typical values of various parameters mentioned earlier are as follows:

$$\alpha_{beef} = 1.23 \times 10^{-4}/°\text{ C. at } 36° \text{ C.}$$

$$c_{0beef} = 1565 \text{ m/s at } 37° \text{ C.}$$

$$d_{0beef} \approx 1.0 \text{ mm at } 37° \text{ C.}$$

$$\frac{\partial c(T)}{\partial T_{beef}} = 1.0 \text{ m/s/° C.}$$

These values are quite close to that for water, hence as first approximation values for water can be used for testing.

To ascertain that food is cooked properly and thoroughly it is essential to make sure that innermost area is cooked properly. This however means that method used should be able to look at certain area and depth of food.

Figure 1:
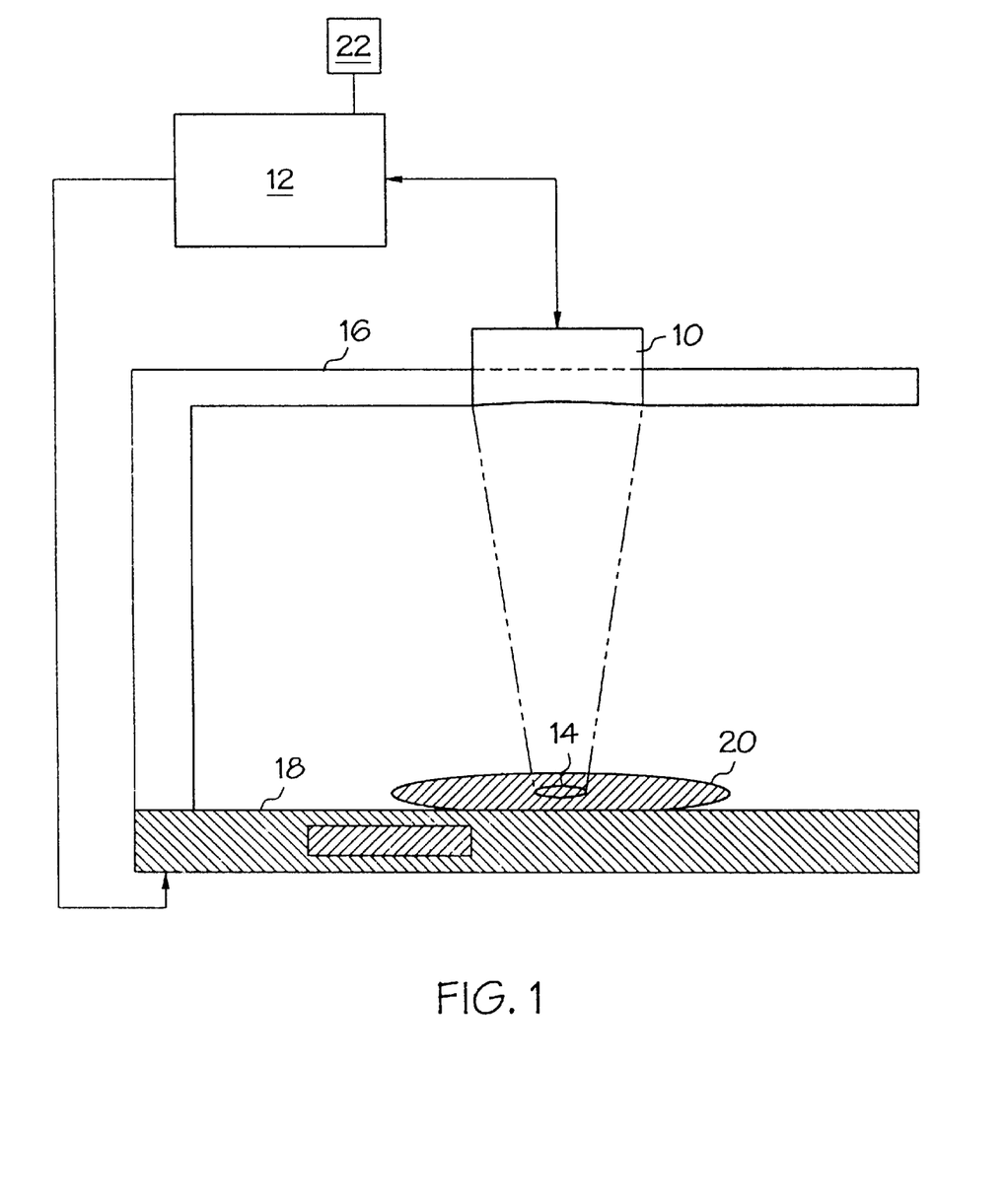
FIG. 1 is a schematic representation of a system for performing the ultrasonic temperature approximation method for according to the present invention.

As shown in FIG. 1, the first embodiment of the present invention utilizes an ultrasonic probe or transducer 10 controlled by a computer controller 12. The ultrasonic transducer has a focal area 14 as well as a focal depth sufficient to reach the core of the food product. The transducer 10 is mounted to the frame 16 of the cooking apparatus to position the transducer over the cooking surface 18 of the cooking apparatus in vertical alignment with the food product 20 being cooked on the cooking surface. In such a position, the ultrasonic transducer 10 is able to focus directly upon the food product 20 being cooked. The return/reflected signals from the food product (target) will be processed by a high-resolution power spectral density analyzer (or other suitable signal processing devices/algorithms), which is preferably resident in the computer controller 12 of the cooking apparatus.

Because different types of foods may require different constants for accurate analyses of data obtained by the transducer, the computer controller 12 preferably includes a database with the appropriate constants for use with the various food products that may be cooked by the cooking apparatus. Therefore, the computer controller 12 also preferably includes a user interface that allows a user to select the type of food product(s) being cooked. Based upon this selection, the appropriate constants will be obtained from the database for use with the high-resolution power spectral density analyzer.

The ultrasonic probe or transducer 10 generates waves in the ultrasonic range of frequencies. These waves, when targeted on the food product 20, excite the particles of food in the focal area of the food product 20 to vibrate. The particles vibrate at their fundamental or natural frequency. As the heating surface 18 heats the food product 20, the natural frequency of food particles changes. Change of shift in natural frequency is dependent upon characteristics of the food.

The shift in natural frequency of food particles corresponding to every degree increase in temperature is not distinct enough for the transducer 10 to make quantitative evaluation of shift. However the shift in higher harmonics of natural frequency is larger and is easier to be detected. The shift in higher harmonics is then scaled down to per degree change in temperature.

1. Sample Calculation:
   1.) Assuming that an ultrasonic transducer is generating the pulses at 65 kHz. It excites the food particles and forces food particle to vibrate at their natural frequency.
   2.) For example let the food temperature be 100° F. and the natural frequency is 2.5 MHz.

$T_1$=100° F. at $f_1$=2.5 MHz

Let the temperature change by 10° F. to 110° F. The natural frequency (for example) changes by (−) 700 Hz/°F. This change in frequency is really small for transducer to analyze. However the shift in $10_{th}$ harmonics is (−) 7.0 kHz/°F. Transducer can easily analyze this shift and give a temperature reading of food.

$f_{10}$=25 MHz at 100° F.

$f^1_{10}$=24.93 MHz at 110° F.

Now each shift of (−) 4.0 kHz of $10_{th}$ harmonic is associated with one (1) degree increase in temperature. Therefore to reach a safe cooking temperature of 170° F. the $10^{th}$ harmonics should reach $f^2_{10}$=24.51 MHz Now when the transducer starts reading almost all the frequencies in the above range the food computer controller 12 will consider the food product 20 to be adequately cooked and will signal an alarm 22 (which may be visual or audible) to let the use know that the food product 20 may be served to the customer. Alternatively, the computer controller 12 may also control the heat of the heating surface 18 according to the frequencies detected by the transducer 10.

Temperature Assessment Using Infra-Red Waves

The second embodiment of the present invention utilizes an infrared sensor to monitor the rate of change in the surface temperature of the food products, which is used to estimate core temperature of the food products. In the open type (one side heated) of cooking apparatuses (such as griddles, grills, etc.), a general way of cooking food products is place one side of the food product on the cooking surface of the apparatus (first cooking phase) and then flip the food product to cook the other side of the food product (second cooking phase). This embodiment of the present invention will preferably monitor the top surface temperature of the food product during the second phase, or any later phases, of cooking.

Rate of change of temperature of the top surface of the food product may depend on heating surface temperature, heat transfer rate across the food product, thermal diffussivity across the food product, initial temperature of food product and also the temperature that the food product has reached before being turned or flipped over. The heat transfer rate over the cross section of the food product, in turn, could vary according to chemical composition of food product, water content and change in thermal and physical properties with temperature.

The present embodiment of the invention utilizes an algorithm of following general nature to calculate the core temperature $T_{core}$, $$T_{core} = T_1 + \frac{(T_2 - T_1)}{(t_{T2} - t_{T1})} \times C_1 \tag{10}$$

Where $T_1$ and $T_2$ are the temperatures of top surface of the food product at time $t_{T1}$ and $t_{T2}$ ($t_{T2}>t_{T1}$). The factor $C_1$ may be a function of various properties of food and temperature. The second term in the equation (10) represents the rate of change of temperature with time. During the initial temperature pick-up, the top surface temperature of the food product may actually reduce before starts receiving heat from heating surface by conduction through the cross section of food.

In order to apply this algorithm $C_1$ needs to be experimentally established for different kind of foods. Also, since it is known that infrared temperature sensors depend upon the emmissivity of the target surface, separate tests for various foods may be required. Factor $C_1$ is related to thermal properties of the food, cross-sectional area of the food and temperature; and may be defined as, $$C_1 = f(\alpha, c, T, a) \quad (11)$$

Where $\alpha$ is thermal conductivity, c is specific heat, T is the average temperature and a is the cross sectional area.

Some known food properties are listed below

TABLE 1

| Food | Specific Heat(Btu/lb./° F.) | | Latent | Thermal Conductivity Btu/hr.ft.° F. | |
|---|---|---|---|---|---|
| | Above Freezing | Below Freezing | Heat Btu/lb. | Temperature ° F. | Thermal conductivity |
| Beef (fresh) | 10.5 | 6.6 | 427 | 43 | |
| Pork | | | | | 0.8447 |
| | | | | 140 | 0.91 |
| Broiler | | | | — | 0.71 |
| Poultry (fresh and frozen) | 13.85 | 6.48 | 573 | | |

Once function $C_1$ is established the core temperature of the food product can be monitored online and be used to control the heating temperature of the cooking surface or signal the operator when the food product is adequately cooked.

Figure 2:
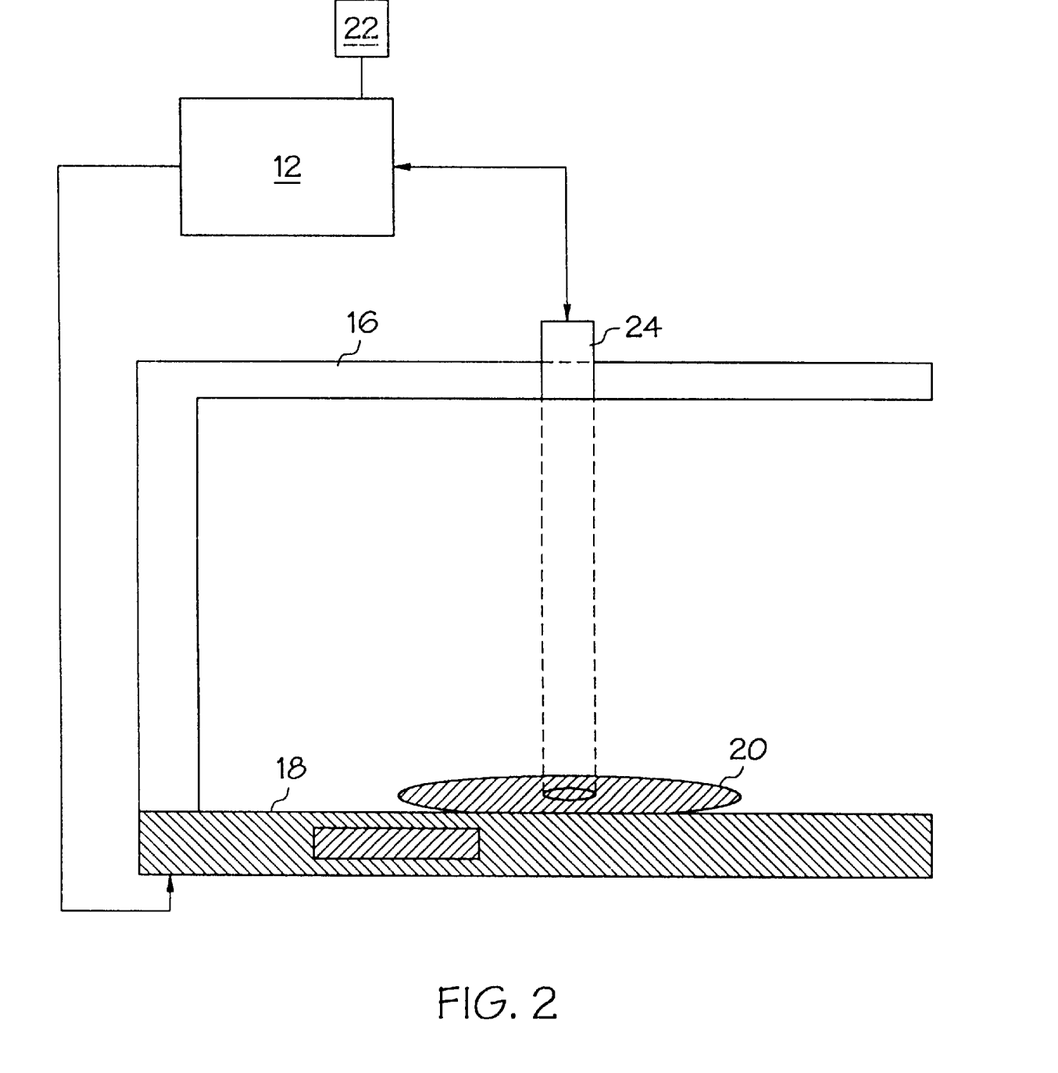
FIG. 2 is a schematic representation of a system for performing the infrared temperature approximation method according to the present invention.
Figure 3A:
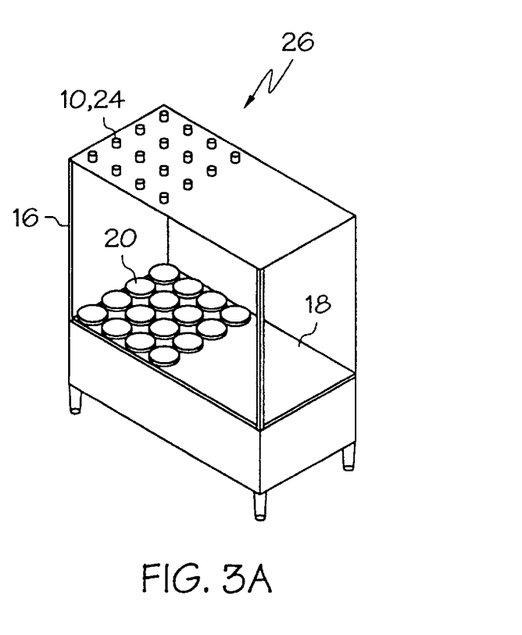
FIGS. 3a, 3b, 3c, and 3d are perspective, elevational-front, elevational-side and top plan views, respectively, of a cooking apparatus having non-contact measurement devices permanently mounted above the cooking surface.
Figure 3B:
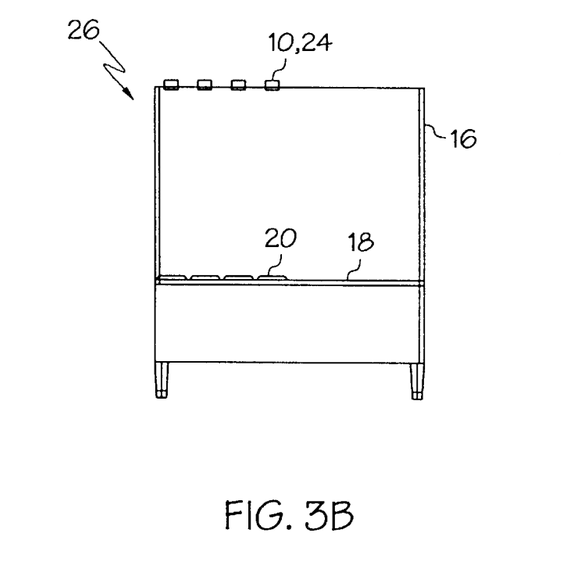
Figure 3C:
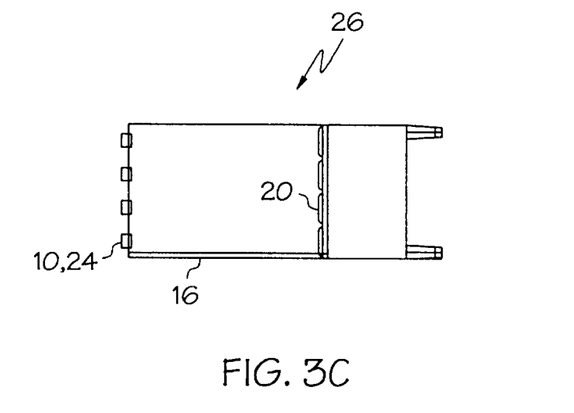
Figure 3D:
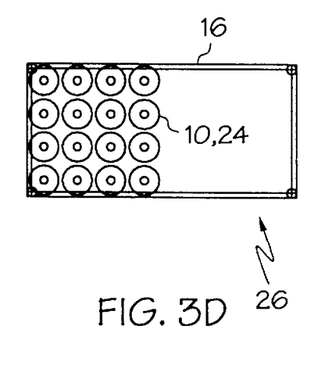
Figure 4A:
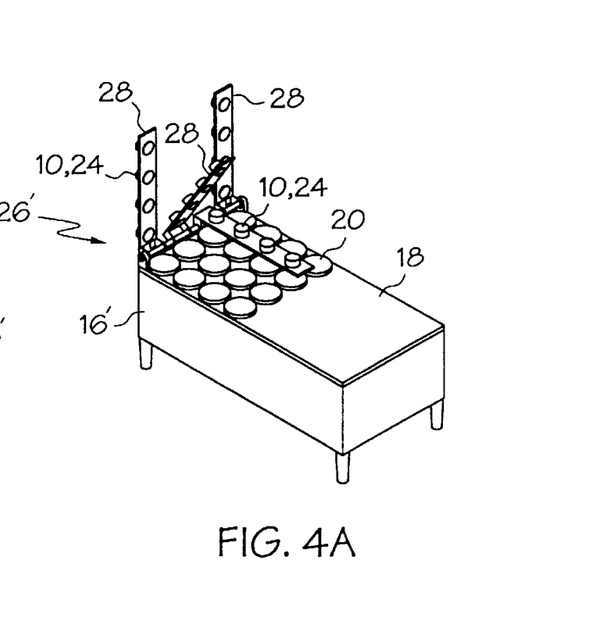
FIGS. 4a, 4b, 4c, and 4d are perspective, elevational-front, elevational-side and top plan views, respectively, of a cooking apparatus having non-contact measurement devices mounted to arms that may be pivoted in position above the cooking surface.
Figure 4B:
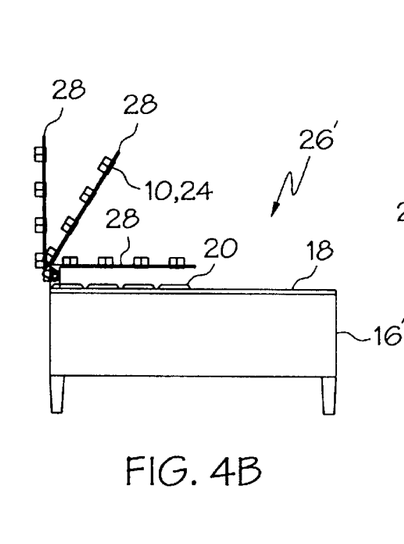
Figure 4C:
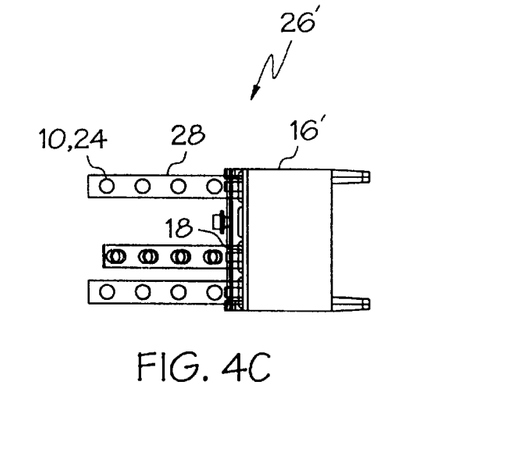
Figure 4D:
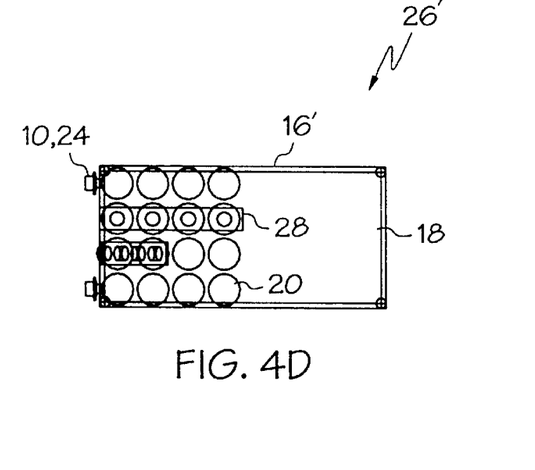

As shown in FIG. 2, the second embodiment of the present invention utilizes a non-contact infrared sensor 24 controlled by a computer controller 12. Preferably the IR sensor 24 utilizes a circular spot focus, in which there are multiple spot focuses along a circumference. This offers a better monitoring as compared to spot focus since circular focus can monitor a larger area. The IR sensor 24 is mounted to the frame 16 of the cooking apparatus to position the IR sensor 24 over the cooking surface 18 of the cooking apparatus in vertical alignment with the food product 20 being cooked on the cooking surface. In such a position, the IR sensor 24 is able to focus directly upon the food product 20 being cooked.

Because, as shown above in Table 1, different types of foods may have different factors $C_1$, the computer controller 12 preferably includes a database with the appropriate factors $C_1$ for use with the various food products that may be cooked by the cooking apparatus. Therefore, the computer controller 12 also preferably includes a user interface that allows a user to select the type of food product(s) being cooked. Based upon this selection, the appropriate factors $C_1$ will be obtained from the database for use in calculating the core temperature $T_{core}$ of the food product.

When the computer controller 12 calculates that the core temperature $T_{core}$ of the food product 20 has reached an ideal temperature (or is in a range of ideal temperatures), the computer controller 12 will preferably signal an alarm 22 (which may be visual or audible) to let the user know that the food product 20 may be served to the customer. Alternatively, the computer controller 12 may also control the heat of the heating surface 18 according to the detected core temperature $T_{core}$ of the food product 20.

The infrared sensor 24 generates a mV (millivolt) output signal corresponding to the black body temperature of its target. The output signal is generally non-linear, i.e., the function relating the millivolts and the surface temperature could be similar to $$T = C_1 V^2 + C_2 V + C_3 \quad (12)$$

Where T is the surface temperature,

V is the millivolt output form IR sensor 24, $C_1$, $C_2$, $C_3$ are the constants ($C_1$, $C_2$, $C_3$ depend upon the emmissivity of surface and the distance of surface from sensor).

In order to estimate the core temperature $T_{core}$ of the food product 20, the preferred method uses continuous monitoring of the top surface temperature of the food product. The rate of rise of the top surface temperature is then correlated to the core temperature of the food product.

The core temperature can be related to the rate of rise of top surface temperature using a relation like $$T_{core} \propto \left(\frac{\Delta T}{\Delta t}\right) \quad (13)$$

$$T_{core} = T - C(f) \times \left(\frac{\Delta T}{\Delta t}\right)^n \quad (14)$$

Where 'n' is a constant, 'C' is a function depended upon the food properties, T is the top surface temperature and $\Delta T$ is the change in the top surface temperature in the time $\Delta t$.

$$C = f(k, s) \quad (15)$$

Where 'k' is the thermal conductivity,

's' is the specific heat of food.

Since the specific heat and thermal conductivity of food changes with change in the food temperature, 'C' would also change with change in temperature. Note that there is marked change in these properties with temperatures in the vicinity of freezing point of food.

The infrared sensor 24 preferably takes top surface readings every 2 (two) seconds (or some other sufficient time period as desired). Signal processing devices/algorithms, preferably resident within the computer control 12, then calculate the rate of change of top surface temperature after every sensor reading. Using the rate of change of temperature and properties, the core temperature is calculated. This cycle continues until the core temperature and rate of rise of top surface temperature match a predetermined curve.

1. Sample Calculation:

1.) Assuming that the food product (hamburger patty) has just been turned over and infrared sensor starts to pick up the top surface temperature:
Say at time
t=0 sec.
Top surface temperature ($T_0$) is 300° F.
And after t=2 sec. The temperature ($T_2$)=295° F.

$$\left(\frac{\Delta T}{\Delta t}\right) = -2.5° \text{ F./sec}$$

Processor will ignore this reading because of negative change in temperature. Processor would keep on monitoring the temperature till a positive change in temperature is detected.

2.) Say that after 60 second the top surface temperature starts to rise.
Temperature at time t=60 sec
$T_{60}$=200° F.

And temperature at time t=62 sec $$T_{62} = 204° \text{ F.}$$

$$\left(\frac{\Delta T}{\Delta t}\right) = 2° \text{ F./sec}$$

Processor now calculates the core temperatures. Also processor will compare the rate of rise of temperature & top surface temperature with a standard curve to establish status of cooking. The standard curve could be established during testing.

Note that the function given for relating the rate of rise of top surface temperature is only provided as an example. It can be changed/modified during testing to arrive at a better and more reliable algorithm.

Physical Embodiments

As shown in FIGS. 3a–3d, the ultrasonic or infrared transducers 10, 24 can be permanently mounted onto the frame 16 of the cooking apparatus 26, directly above the cooking surface 18, where one transducer would be provided for every spot on the cooking surface where a food product 20 would be cooked. As shown in FIGS. 4a–4d, the ultrasonic or infrared transducers 10, 24 can be mounted to pivoting arms 28, which are pivotally mounted to the frame 16' of the cooking apparatus 26'. The arms 28 may be pivoted from a first vertical position, where the transducers are not positioned over the cooking surface 18, to a second horizontal position, where the transducers are positioned over the cooking surface 18. This embodiment would be particularly useful in situations where the transducers 10, 24 need to be positioned close to the food products to get an accurate reading, for example.

What is claimed is:

1. A method for determining an internal temperature of a food product being cooked upon a cooking surface comprising the steps of:
   (a) positioning an ultrasonic transducer over a food product being cooked upon a cooking surface;
   (b) activating the ultrasonic transducer to generate ultrasonic waves targeted to the food product;
   (c) positioning an ultrasonic probe over the food product;
   (d) activating the ultrasonic probe to detect ultrasonic waves reflected from the food product; and
   (e) processing the reflected ultrasonic waves to calculate an approximate internal temperature of the food product.

2. The method of claim 1, wherein the ultrasonic transducer has a focal depth sufficient to reach a core of the food product.

3. The method of claim 2, wherein the processing step includes the step of utilizing a high-resolution power spectral density analyzer.

4. The method of claim 1, wherein the processing step calculates the approximate internal temperature according to a function of: (i) a detected change in fundamental frequency of the food product; and (ii) at least one constant related to properties of the food product being cooked.

5. The method of claim 4, wherein:
   the processing step is performed by a computer controller operatively coupled to the ultrasonic transducer and the ultrasonic probe;
   the computer controller includes a table listing a plurality of different food products along with their associated constant;
   the computer controller includes a user interface allowing a user to select a type of food product being cooked;
   the method includes the steps of: (f) a user selecting a type of a food product being cooked using the user interface, and (g) the computer controller accessing the constant corresponding to the selected food product from the table.

6. The method of claim 5, wherein the computer controller is operatively coupled to an alarm and the method includes the step of the computer controller activating the alarm upon calculating an approximate internal temperature of the food product that is greater than a predetermined temperature.

7. The method of claim 5, wherein the computer controller is operatively coupled to the cooking surface and the method includes the step of the computer controller controlling the heat of the cooking surface based, at least in part, upon the approximate internal temperature of the food product calculated in the processing step.

8. The method of claim 4, wherein the processing step obtains the approximate internal temperature according to a detected change in higher harmonics of the fundamental frequency of the food product.

9. A method for determining an internal temperature of a food product being cooked upon a cooking surface comprising the steps of:
   (a) positioning an infrared sensor over a food product being cooked upon a cooking surface;
   (b) obtaining a first surface temperature reading of the food product at a first point in time with the infrared sensor;
   (c) obtaining a second surface temperature reading of the food product at a second point in time with the infrared sensor; and
   (d) approximating an internal temperature of the food product using the first and second temperature readings.

10. The method of claim 9, further comprising the steps of, prior to steps (b)–(d):
    (e) placing the food product on the cooking surface; and
    (f) flipping the food product on the cooking surface after a predetermined period of time.

11. The method of claim 10, further comprising the step of, after step (f) and prior to step (b), obtaining continuous surface temperature readings of the food product until the surface temperature of the food product is detected to rise.

12. The method of claim 11, wherein steps (b) through (d) are repeated until the approximated internal temperature of the food product reaches or exceeds a predetermined value.

13. The method of claim 9, wherein steps (b) through (d) are repeated until the approximated internal temperature of the food product reaches or exceeds a predetermined value.

14. The method of claim 9, wherein the approximating step approximates the internal temperature according to a fiction of at least: (i) the first and second temperature readings; and (ii) a constant related to properties of the food product being cooked.

15. The method of claim 14, wherein:
    the approximating step is performed by a computer controller operatively coupled to the infrared sensor;
    the computer controller includes a table listing a plurality of different food products along with their associated constant;
    the computer controller includes a user interface allowing a user to select a type of food product being cooked;
    the method includes the steps of: (e) a user selecting a type of a food product being cooked using the user interface, and (f) the computer controller accessing the constant corresponding to the selected food product from the table.

16. The method of claim 15, wherein the computer controller is operatively coupled to an alarm and the method includes the step of the computer controller activating the alarm upon approximating an internal temperature of the food product that is greater than a predetermined temperature.

17. The method of claim 15, wherein the computer controller is operatively coupled to the cooking surface and the method includes the step of the computer controller controlling the heat of the cooking surface based, at least in part, upon the approximated internal temperature of the food product.

18. A cooking apparatus comprising:
   a frame;
   a cooking surface mounted to the frame wherein the cooking surface transfers heat to a food product that is received on the surface;
   at least one infrared sensor for detecting the surface temperature of the food product received on the cooking surface, the infrared sensor being mounted to the frame, above the cooking surface;
   a computer controller operatively coupled to the infrared sensor for approximating an internal temperature of the food product received on the cooking surface according, at least in part, to signals received by the infrared sensor.

19. The cooking apparatus of claim 18, wherein the computer controller includes:
   a table listing a plurality of different food products along with values corresponding to their associated properties, the values being used by the computer controller in approximating the internal temperature of food products; and
   a user interface allowing a user to select a type of food product being cooked;
   wherein the computer controller accesses the values corresponding to the selected food product from the table for approximating the internal temperature of the food products.

20. The cooking apparatus of claim 19, wherein the computer controller is operatively coupled to an alarm and the computer controller activates the alarm upon approximating an internal temperature of the food product that is greater than a predetermined temperature.

21. The cooking apparatus of claim 19, wherein the computer controller is operatively coupled to the cooking surface and the computer controller controls the heat of the cooking surface based, at least in part, upon the approximated internal temperature of the food product.

22. The cooking apparatus of claim 18, wherein the frame includes at least one arm, pivotally mounted to the frame, pivotable from a first position in which a first portion of the arm is positioned directly over the cooking surface to a second position in which the first portion of the arm is positioned away from the cooking surface, to which the infrared sensor is mounted to the first portion of the arm.

23. A cooking apparatus comprising:
   a frame;
   a cooking surface mounted to the frame;
   at least one arm, pivotally mounted to the frame, pivotable from a first position in which a first portion of the arm is positioned directly over the cooking surface to a second position in which the first portion of the arm is positioned away from the cooking surface;
   at least one transducer for detecting temperature related characteristics of food products mounted to the first portion of the arm;
   a computer controller operatively coupled to the transducer for approximating an internal temperature of food products being cooked on the cooking surface according, at least in part, to signals received by the transducer.

24. The cooking apparatus of claim 23, wherein the transducer is an ultrasonic transducer.

25. The cooking apparatus of claim 23, wherein the transducer is an infrared sensor.

26. The cooking apparatus of claim 23, wherein the computer controller includes:
   a table listing a plurality of different food products along with values corresponding to their associated properties, the values being used by the computer controller in approximating the internal temperature of food products; and
   a user interface allowing a user to select a type of food product being cooked;
   wherein the computer controller accesses the values corresponding to the selected food product from the table for approximating the internal temperature of the food products.

27. The cooking apparatus of claim 26, wherein the computer controller is operatively coupled to an alarm and the computer controller activates the alarm upon approximating an internal temperature of the food product that is greater than a predetermined temperature.

28. The cooking apparatus of claim 26, wherein the computer controller is operatively coupled to the cooking surface and the computer controller controls the heat of the cooking surface based, at least in part, upon the approximated internal temperature of the food product.

29. A cooking apparatus comprising:
   a frame;
   a cooking surface mounted to the frame wherein the cooking surface transfers heat to a food product that is received on the surface;
   at least one ultrasonic transducer for detecting the frequency of ultrasonic waves reflected from the food product received on the cooking surface, the ultrasound transducer being mounted to the frame, above the cooking surface; and
   a computer controller operatively coupled to the ultrasonic transducer for approximating an internal temperature of the food product being cooked on the cooking surface according, at least in part, to signals received by the ultrasonic transducer.

30. The cooking apparatus of claim 29, wherein the frame includes at least one arm, pivotally mounted to the frame, pivotable from a first position in which a first portion of the arm is positioned directly over the cooking surface to a second position in which the first portion of the arm is positioned away from the cooking surface, to which the ultrasound transducer is mounted to the first portion of the arm.

* * * * *

UNITED STATES PATENT AND TRADEMARK OFFICE
CERTIFICATE OF CORRECTION

PATENT NO. : 6,299,920 B1
DATED : October 9, 2001
INVENTOR(S) : Atul Saksena

It is certified that error appears in the above-identified patent and that said Letters Patent is hereby corrected as shown below:

<u>Column 10, claim 14,</u>
Line 54, the word "fiction" should be -- function --.

Signed and Sealed this

Twenty-sixth Day of March, 2002

Attest:

*Attesting Officer*

JAMES E. ROGAN
*Director of the United States Patent and Trademark Office*